Jan. 6, 1970                    G. P. R. FARR                    3,488,687
                            SELF-ADJUSTING MECHANISMS
Filed Dec. 18, 1967                                          3 Sheets-Sheet 1

United States Patent Office 3,488,687
Patented Jan. 6, 1970

3,488,687
SELF-ADJUSTING MECHANISMS
Glyn Phillip Reginald Farr, Kenilworth, England, assignor to Girling Limited, Birmingham, England
Filed Dec. 18, 1967, Ser. No. 691,565
Claims priority, application Great Britain, Dec. 20, 1966, 56,904/66
Int. Cl. F16d 5/38, 55/10
U.S. Cl. 188—196                                        19 Claims

ABSTRACT OF THE DISCLOSURE

A uni-directionally self-adjusting force transmitting mechanism comprises a pair of members screw-threaded together, the coefficient of friction between one pair of mating flanks being less than the coefficient between the other pair so that the screw thread connection is reversible in one direction but non-reversible and capable of transmitting axial force in the other direction. Illustrative embodiments comprise an automatic adjuster in a hydraulic actuator of a disc brake. The hydraulic actuator includes opposed pistons, one of which journals a cam serving as an auxiliary mechanical actuator and acting through the automatically adjustable mechanism upon the other piston.

---

The present invention relates to a self-adjusting force transmitting mechanism comprising two members capable of transmitting a force in one direction but self-adjusting relative to one another in the other direction and is particularly, although by no means exclusively, applicable to automatic adjusters for vehicle brake systems.

According to the present invention, a uni-directionally self-adjusting force transmitting mechanism comprises two relatively rotatable members in screw-threaded inter-engagement with one another, the coefficient of friction between one flank of the screw thread on one member and the mating screw thread flank on the other member being comparatively high whilst the coefficient of friction between the other flank on the one member and its mating flank on the other member is comparatively low, whereby the screw thread is a non-reversible thread capable of transmitting substantial force in one axial direction but is a reversible screw thread in the other axial direction so that force applied in the other direction causes relative rotation and thereby automatic adjustment between the members.

A reversible screw thread connection is one in which the pitch and flank angles of the thread and the coefficient of friction between the mating surfaces of the thread are such that an axially applied force between the members can cause relative rotation therebetween.

The different coefficients of friction may be obtained by coating one flank of one screw thread with a low friction material such as polytetrafluoroethylene or by placing an insert of low friction material between one pair of mating flanks.

However it is preferred to make one of the members in two parts respectively of high and low friction materials, the screw thread having respective portions in these two parts, which portions are relatively angularly offset so that one flank on the low friction part mates with one flank on the other member, whilst the other flank on the high friction part mates with the other flank on the other member.

The invention is especially applicable to automatic adjusters for disc brakes. In a disc brake having a hydraulic actuator which comprises a pair of opposed pistons the automatic adjuster may be placed between these pistons and an auxiliary mechanical brake applying device may act between these pistons through the automatic adjuster which must therefore be capable of transmitting a substantial load in its non-reversible direction.

Figure 1:
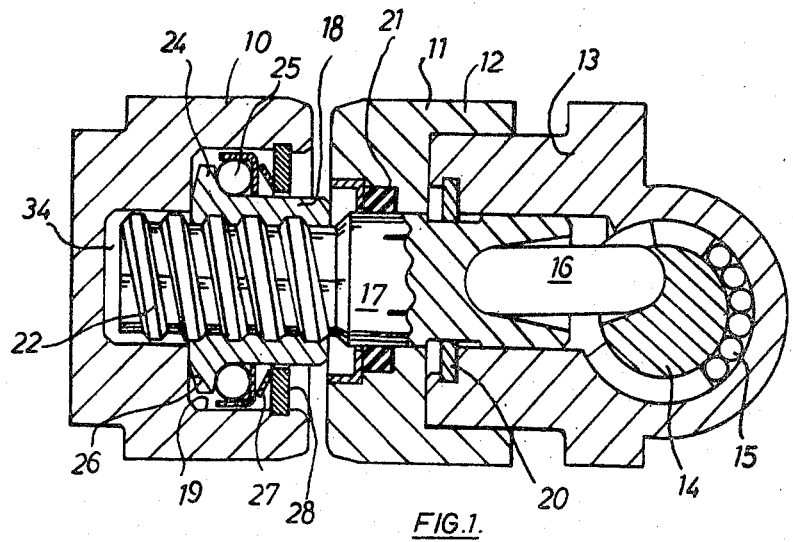
Figure 2:
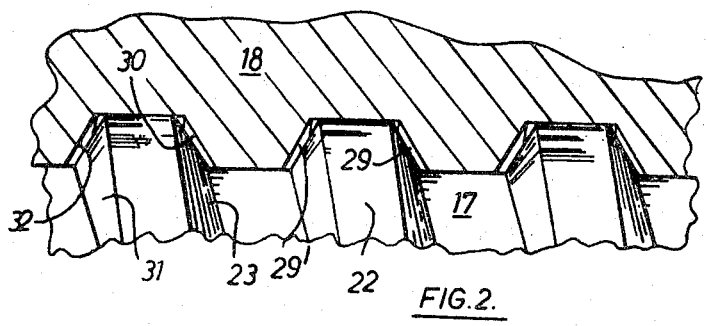
Figure 3:
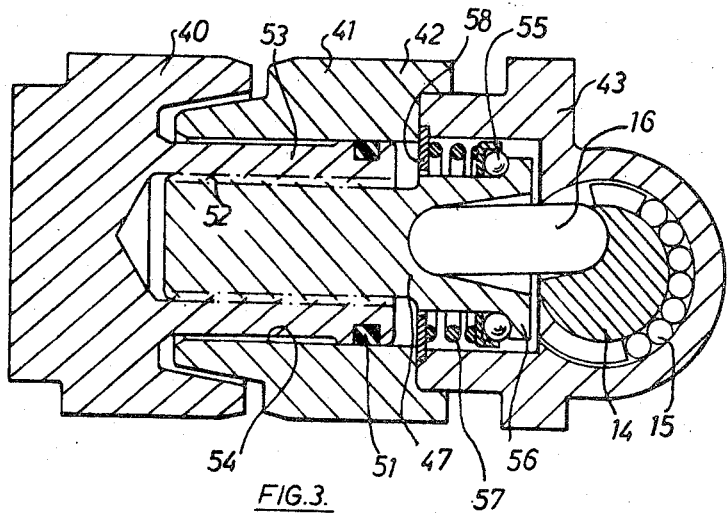
Figure 4:
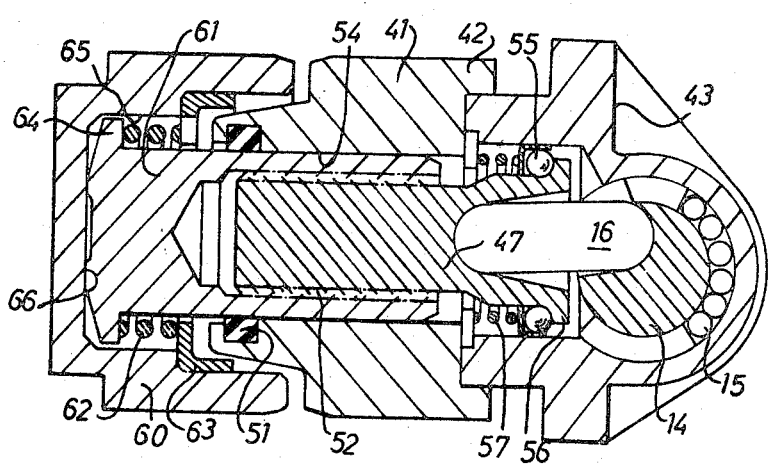
Figure 5:
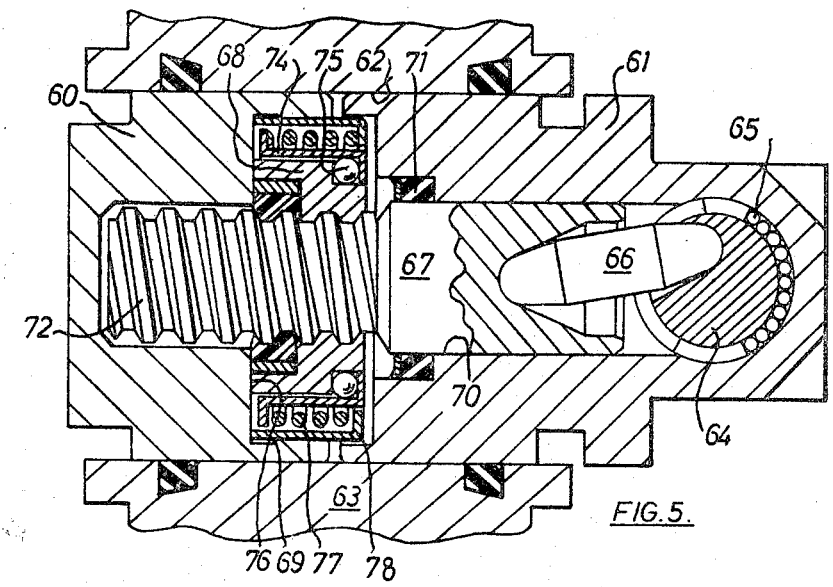
Figure 6:
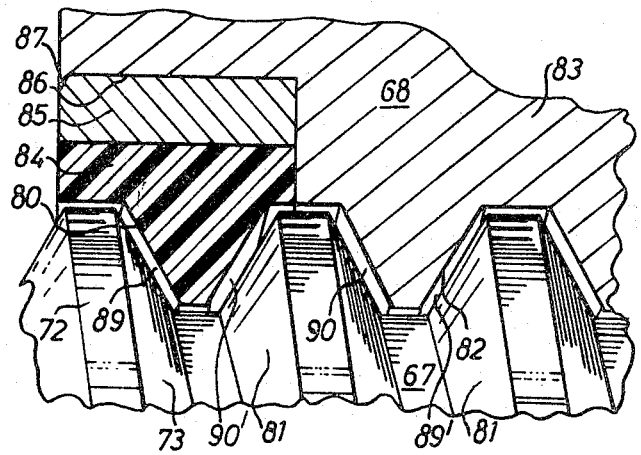

The invention is further described, by way of example, with reference to the accompanying drawings, in which:

FIG. 1 is a longitudinal section of a pair of opposed pistons of a hydraulic actuator for a disc brake and provided with a force-transmitting mechanism between the pistons and constructed in accordance with one embodiment of the invention, FIG. 2 is a very much enlarged detail section of the screw threads of the mechanism of FIG. 1, FIG. 3 is a longitudinal section of a second embodiment of force-transmitting mechanism as applied to opposed pistons of a hydraulic actuator for a disc brake, FIG. 4 is a cross-section of a modification to the hydraulic actuator of FIG. 3, FIG. 5 is a longitudinal section of a third embodiment of force-transmitting mechanism as applied to an actuator of the kind shown in FIG. 1, and FIG. 6 is a very much enlarged detailed section of the screw threads of the mechanism shown in FIG. 5.

FIG. 1 shows a pair of opposed pistons 10 and 11 which form part of a hydraulic actuator for a disc brake of the kind described and illustrated in U.S. Patent No. 3,245,500 to Hambling et al. and in U.S. Patent No. 3,421,602 by Hadyn L. Craske.

The pistons 10 and 11 are slidable in opposite directions in a bore through body member of the brake by fluid pressure applied between the pistons. The piston 10 is an inner piston which bears against the back of a directly operated brake pad whilst the piston 11 acts against a yoke which is slidable in grooves along opposite sides of the body member and which supports an indirectly operated pad opposed to the directly operated pad. The outer piston 11 is in two parts 12 and 13 of which the part 12 is sealed to the bore of the body member whilst the part 13 bears against the yoke. An auxiliary mechanical brake applying mechanism, such as a hand brake mechanism, comprises a cam 14 journalled by rollers 15 in the piston part 13 and acts through a dolly 16 against one member 17 of a uni-directionally self-adjusting force transmitting mechanism which includes a second member 18 housed almost completely within a blind bore 19 in the inner piston 10. The piston part 13 is prevented from rotating by the yoke and by the cam 14 and a clip 20 prevents the mechanism member 17 from rotating relative to the piston part 13.

A sealing ring 21 seals the piston part 12 to the member 17.

The member 18 is in the form of a nut in engagement with the member 17 by a screw thread 22 shown in more detail in FIG. 2. The screw thread is a uni-directionally reversible screw thread and to achieve this property one flank 23 of the screw thread 22 on the member 17 is coated with an antifriction material, such as polytetrafluoroethylene. The nut 18 has a collar 24 against which a thrust bearing 25 bears to urge the nut 18 against a shoulder 26 in the piston bore 19. A Belleville washer 27, acting between a circlip sprung into position in the open end of the blind bore 19 and the thrust bearing 25, exerts an axial force of about 10 lbs.

There is a certain amount of axial clearance 29, 29′ (FIG. 2) at the screw thread 22 and this clearance is sufficient to permit the normal very small relative movement between the pistons 10 and 11 which takes place upon actuation of the brakes by the application of hydraulic pressure between the pistons 10 and 11 and to allow for axial expansion of the friction linings due to severe braking. For normal application of the brake, the braking fluid pressure is applied to the space between the pistons 10 and 11 to urge the pistons apart. The braking fluid pressure also reaches the inner end 34 of the blind bore 19 through the thread clearance 29, 29' and urges the member 17 against the dolly 16. If there is excessive piston travel at any time due to pad wear then the flank 23 on the screw thread 22 engages the corresponding flank 30 on the screw thread on the nut 18 with low friction and tends to urge the nut 18 away from the end 26 of the bore 19. As the thrust bearing 25 applies only a small torque resistance to rotation of the nut 18 whereas the clip 20 prevents the member 17 from turning and the fluid pressure prevents axial movement of the member 17 relative to the piston 10, the excess travel of the piston 10 relative to the member 17 causes the nut 18 to turn on the member 17 and so slightly increase the length of the mechanism 17, 18. Thus in this direction of force application the screw threaded connection is reversible. When the hand brake is applied the nut 24 cannot turn because the flank 31 of the screw thread 22 now comes into comparatively high frictional engagement with the corresponding flank 32 on the nut 18. Thus in this direction of force application the screw threaded connection is non-reversible. The length of the mechanism 17, 18 has thereby been slightly increased automatically responsively to pad wear.

The mechanism 17, 18 limits the relative movement of the pistons 10 and 11 towards one another upon release of the brake fluid pressure because the cam 14 acting on the member 17 through the dolly 16 has a fixed angular resting position and is journalled in the piston part 13.

The Belleville washer 27 creates sufficient friction between the nut 18 and the shoulder 26 in the piston 10 to enable the nut to be screwed back by turning the piston 10 relative to the member 17, which is prevented from rotation by the clip 20, when worn pads are replaced by new pads.

In place of a low friction coating on the screw thread flank 23 or on the corresponding flank 30 of the nut 18, a low friction insert may be placed between the flanks 23 and 30 whilst still allowing sufficient axial play to permit application of the brakes without automatic adjustment taking place when the pads are not worn.

The embodiment shown in FIG. 3 is generally similar to that of FIG. 1 but has the advantage that there are fewer parts and the screw thread, reversible in one direction but irreversible in the other direction, is not submerged in the brake fluid. The hydraulic actuator shown in FIG. 3 comprises opposed pistons 40 and 41 which operate in the same manner as the pistons 10 and 11 of FIG. 1. The piston 41 is in two parts 42 and 43 and the part 43 contains a cam 14 journalled by rollers 15 and acting on the dolly 16 which bears against a member 47 of the automatically adjustable force transmitting mechanism. The piston 40 has an integral tubular boss 53 which is sealed to a bore 54 in the piston part 42 by a resilient sealing ring 51. In this embodiment the force transmitting mechanism includes the piston 40 itself.

A screw thread 52 between the member 47 and the boss 53 on the piston 40 has identical properties to the screw thread 22 in the embodiment of FIGS. 1 and 2. The sealing ring 51 prevents the hydraulic fluid from reaching the screw thread 52.

The member 47 has a flange 56 against which bears a thrust bearing 55 corresponding to the thrust bearing 25 of FIG. 1. A spring 57 producing an axial force of about 10 lbs. acts between a disc 58 and the thrust bearing 55. The disc 58 is firmly located between the piston parts 42 and 43. The embodiment of FIG. 3 operates in the same manner as the embodiment of FIGS. 1 and 2 except that the spring 57 holds the member 47 against the dolly 16 rather than fluid pressure and, when adjustment takes place, the member 47 turns rather than the piston 40.

The embodiment of hydraulic actuator of FIG. 4 is generally similar to that of FIG. 3 and like parts are denoted by like reference numerals. However, the piston 40 screw-threaded on to the member 47 is replaced by a piston 60 and a nut membr 61 in screw-threaded engagement with the member 47. The nut member 61 is sealed to the bore 54 in the piston part 42 by the resilient sealing ring 51. A strong spring 62 acts between a flange 64 on the end of the nut member 61 and a ring 63 force-fitted in a blind bore 65 formed in the piston 60 to receive the end of the member 61. During normal light application of the brakes the spring 62 holds the nut member against the base 66 of the blind bore 65 so that the piston 60 and the nut member 61 move as one and the actuator and the automatic adjuster function in exactly the same manner as those of the embodiment of FIG. 3.

However if the brake is applied heavily, the fluid pressure acting on the left hand end face of the nut member 61 overcomes the force of the spring 62 and the member 61 is separated from the base 66 of the piston 60 so that no further adjustment (if any has already taken place) of the mechanism 47, 61 can take place. Thus it is ensured that heavy application of the brake does not cause over-adjustment. Also, once the fluid pressure has overcome the spring 62, such pressure effectively acts over the full area of the pistons rather than over the annular area of the piston 41 alone.

It will be seen that, in all the above described embodiments, when the mechanical actuator is used, i.e. when the cam 14 is turned, the brake applying force acts through the screw thread 22 or 52 in its non-reversible direction so that no adjustment can take place.

The embodiment shown in FIGS. 5 and 6 comprises a pair of opposed pistons 60 and 61 slidable in a through bore 62 of a body member 63 of a disc brake of the kind previously described. The piston 60 acts on a directly operated pad whilst the piston 61 acts upon a yoke slidably guided in grooves along the opposite sides of the body member 63 and supporting an indirectly operated pad opposed to the directly operated pad. The brake is hydraulically applied by applying pressure through an inlet (not shown) to the space between the pistons 60 and 61. An auxiliary mechanical actuator comprises a cam 64 journalled by rollers 65 in the piston 61. The cam 64 acts upon the piston 60 through a dolly 66 and a self-adjusting mechanism comprising members 67 and 68 joined together by a screw thread 72. The member 67 is in the form of a spindle sealed to a bore 70 in the piston 61 by a resilient sealing ring 71. The member 68 is in the form of a nut partially received in a blind bore 69 in the piston 60. A coil spring 77, acting between an outer bush 78 force fitted in the bore 69 and an inner sleeve 74, acts upon the member 68 through a ball thrust bearing 75 and normally holds the member 68 against the base 76 of the blind bore.

The screw thread 72 is shown more fully in FIG. 6. In the embodiment of FIGS. 5 and 6 the flanks 73 and 81 of the member 67 are not coated with anti-friction material. Instead the member 68 comprises a main part 83 of metal and an insert 84 of low friction material, such as polytetrafluoroethylene. The insert part 84 is integrally moulded with a metallic backing ring 85. Initially the parts 83 and 84 are separately formed with the screw thread of such dimensions as would permit 0.030" relative axial movement on the external screw thread member 67. The part 84 with its backing ring 85 is then fitted in a small counter-bore 86 in the part 83 and is angularly adjusted relative to the part 83 to misalign the internal threads in the parts 83 and 84 to such an extent that the axial play 89, 89' between the members 67 and 68 is reduced to 0.020" and in a direction such that rightward movement of the member 67 relative to the member 68 brings the flank 73 into engagement with the mating flank portion 80 on the low friction part 84 by closing the clearance gap 89 whilst leftward relative movement of the member 67 brings its other flank 81 into engagement with the mating flank portion 82 on the comparatively high friction part 83 by closing the clearance gap 89'.

The part 84 is locked in its adjusted position in the part 83 by peening over the lip 87 of the counter-bore 86. The clearance gap 90 between the flank 73 and the mating flank portion on the part 83 and the clearance gap 90' between the flank 81 and the mating flank portion on the part 84 are thus always greater than the clearance gaps 89 and 89' respectively. The pitch and flank angles of the screw thread 72 are so chosen in relation to the relatively high coefficient of friction between the part 83 of the member 68 and the member 67 and the relatively low coefficient of friction between the part 84 of the member 68 and the member 67 that the screw thread 72 is non-reversible when the member 67 is urged to the left relative to the member 68 by the cam 64 but is reversible when the member 68 is urged to the left relative to the member 67 by the spring 77. Thus it will be appreciated that the mechanism of FIG. 5 operates in exactly the same manner as the mechanism of FIG. 1, the spring 77 being equivalent to the Belleville washer 27 and the resilient sealing ring 71 being equivalent to the clip 20 insofar as it prevents the member 67 from turning when the member 68 is screwed back on to the member 67 by rotating the piston 60 during a pad change.

It will be seen that, when the mechanical actuator in the embodiment of FIGS. 5 and 6 is used, the brake applying force acts through the screw thread 72 in its non-reversible direction so that no adjustment can take place and furthermore in this direction the metal part 83 of the member 68 receives the thrust whereby the low friction part 84 of comparatively weak material is never subjected to brake applying stresses.

The screw threads 22, 52 and 72 of all the illustrated embodiments are of robust construction capable of withstanding the axial force arising when the brake is applied mechanically. The flank angle is fairly small, being of the order of 30° or less, so that the radial counter forces developed at the screw thread when under axial load are comparatively small and there is little tendency to burst the member 18, 40 or 68 provided with the internal thread. Also both flanks are conveniently made with the same flank angle.

I claim:

1. A uni-directionally self-adjusting force transmitting mechanism comprising two relatively rotatable members, and a screw-threaded connection between said members, said screw threaded connection including a male thread on one of said members and a female thread on the other of said members, each of said threads having opposed flanks mating with the corresponding flanks of the other thread, the opposed flanks on each of said threads having substantially the same flank angle, and the coefficient of friction between one flank of the screw thread on one member and the mating screw thread flank on the other member being comparatively high while the coefficient of friction between the other flank on the one member and its mating flank on the other member is comparatively low, whereby the screw-threaded connection is a non-reversible screw capable of transmitting substantial force in one direction but is a reversible screw in the other direction so that force applied in the other direction causes relative rotation and thereby automatic adjustment between said members.

2. A mechanism according to claim 1 which further comprises a coating of low friction material on one flank of the screw thread on one of said members.

3. A mechanism according to claim 1 which further comprises an insert of low friction material between one pair of said mating flanks.

4. A mechanism according to claim 1 wherein a first of said members comprises two parts of different materials, one of said parts comprising a comparatively low friction material and the other of said parts comprising a comparatively high friction material, the screw thread on said one member having respective portions in said two parts, which portions are relatively angularly offset so that one flank portion on the low friction part mates with one flank on the second of said members whilst the other flank portion on the comparatively high friction part mates with the other flank on said second member.

5. A mechanism according to claim 2 wherein said low friction material comprises polytetrafluoroethylene.

6. A mechanism according to claim 4 wherein said one part of said first member comprises polytetrafluoroethylene and metal re-inforcement therefor.

7. A mechanism according to claim 1 which comprises an automatic adjuster in a vehicle brake.

8. In a vehicle brake which includes a hydraulic actuator having at least one piston and also includes an auxiliary mechanical actuator: an automatic adjuster operative between said auxiliary mechanical actuator and said piston of the hydrulic actuator and comprising two relatively rotatable members associated respectively with said mechanical actuator and said piston, and a screw-threaded connection between said members, said screw-threaded connection including a male thread on one of said members and a female thread on the other of said members, each of said threads having opposed flanks mating with the corresponding flanks of the other thread, the opposed flanks of each of said threads having substantially the same flank angle, and the coefficient of friction between one flank of the screw thread on one member and the mating screw thread flank on the other member being comparatively high while the cofficient of friction between the other flank on the one member and its mating flank on the other member is comparatively low, whereby the screw-threaded connection is a non-reversible screw capable of transmitting substantial force in one direction but is a reversible screw in the other direction so that force applied in the other direction causes relative rotation and thereby automatic adjustment between said members.

9. A brake according to claim 8 wherein said actuator piston contains a blind bore, in which a first of said members is at least partially received, and which further comprises spring means axially urging said first member against the base of said blind bore.

10. A brake according to claim 9 which further comprises a thrust bearing and means for preventing the second of said members from rotating, said spring means being operative through said thrust bearing and between said piston and said first member.

11. A brake according to claim 8 which further comprises spring means, a thrust bearing and means restraining a first of said members from rotation, said spring means being operative through said thrust bearing to axially urge the second of said members against the mechanical actuator.

12. A brake according to claim 11 in which said first member comprises means on said actuator piston.

13. A brake according to claim 11 which includes second spring means axially urging said first member into frictional engagement with said piston.

14. A brake according to claim 8 in which the hydraulic actuator comprises opposed pistons slidable in a common bore, said adjuster being operative between the first of said pistons and said auxiliary mechanical actuator and said mechanical actuator being fitted in the second of said pistons.

15. A brake according to claim 11 in which the hydraulic actuator comprises opposed pistons slidable in a common bore said adjuster being operative between the first of said pistons and said auxiliary mechanical actuator and said mechanical actuator being fitted in the second of said pistons, and a sealing ring sealing said pistons to one another for relative sliding movement, said sealing ring being disposed to seal said screw threaded connection from the hydraulic actuating fluid.

16. A brake according to claim 13, in which the hydraulic actuator comprises opposed pistons slidable in a common bore, said adjuster being operative between the first of said pistons and said auxiliary mechanical actuator and said mechanical actuator being fitted in the second of said pistons and a sealing ring sealing said second member to said second piston, said sealing ring permitting relative axial movement therebetween.

17. A brake according to claim 14 in which the auxiliary mechanical actuator comprises a cam journalled in the second piston for rotation about an axis perpendicular to the piston axis.

18. A vehicle brake mechanism which includes in combination a hydraulic actuator having opposed first and second pistons slidable in a common bore; an auxiliary mechanical actuator fitted in said first piston; an automatic adjuster operative between said auxiliary mechanical actuator and said second piston and comprising two relatively rotatable members associated respectively with said mechanical actuator and said piston, a screw-threaded connection between said members, spring means, a thrust bearing and means restraining a first of said members from rotation, said spring means being operative through said thrust bearing to axially urge the second of said members against the mechanical actuator, said screw-threaded connection including a male thread on one of said members and a female thread on the other of said members, each of said threads having opposed flanks mating with the corresponding flanks of the other thread, the coefficient of friction between one flank of the screw thread on one member and the mating screw thread flank on the other member being comparatively high while the coefficient of friction between the other flank on the one member and its mating flank on the other member is comparatively low, whereby the screw-threaded connection is a non-reversible screw capable of transmitting substantial force in one direction but is a reversible screw in the other direction so that force applied in the other direction causes relative rotation and thereby automatic adjustment between said members; and a sealing ring sealing said pistons to one another for relative sliding movement, said sealing ring being disposed to seal said screw-threaded connection from the hydraulic actuating fluid.

19. A vehicle brake mechanism which includes in combination a hydraulic actuator having opposed first and second pistons slidable in a common bore; an auxiliary mechanical actuator fitted in said first piston; an automatic adjuster operative between said auxiliary mechanical actuator and said second piston and comprising two relatively rotatable members associated respectively with said mechanical actuator and said piston, and a screw-threaded connection between said members, first spring means, a thrust bearing, means restraining a first of said members from rotation, said first spring means being operative through said thrust bearing to axially urge the second of said members against the mechanical actuator, and second spring means axially urging said first member into frictional engagement with said second piston, said screw-threaded connection including a male thread on one of said members and a female thread on the other of said members, each of said threads having opposed flanks mating with the corresponding flanks of the other thread, the coefficient of friction between one flank of the screw thread on one member and the mating screw thread flank on the other member being comparatively high while the coefficient of friction between the other flank on the one member and its mating flank on the other member is comparatively low, whereby the screw-threaded connection is a non-reversible screw capable of transmitting substantial force in one direction but is a reversible screw in the other direction so that force applied in the other direction causes relative rotation and thereby automatic adjustment between said members; and a sealing ring sealing said second member to said second piston, said sealing ring permitting relative axial movement therebetween.

References Cited

UNITED STATES PATENTS

| | | | |
|---|---|---|---|
| 2,949,173 | 8/1960 | Peras | 188—196 |
| 3,244,260 | 4/1966 | Frayer | 188—196 |

DUANE A. REGER, Primary Examiner

U.S. Cl. X.R.

188—73